United States Patent
Ghirelli et al.

(10) Patent No.: US 12,521,754 B2
(45) Date of Patent: Jan. 13, 2026

(54) DISPENSING DEVICE FOR A GRANULAR MATERIAL

(71) Applicant: SYSTEM CERAMICS S.P.A., Fiorano Modenese (IT)

(72) Inventors: Ivan Ghirelli, Castellarano (IT); Franco Gozzi, Formigine (IT); Paolo Vaccari, Modena (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 292 days.

(21) Appl. No.: 17/595,788

(22) PCT Filed: May 21, 2020

(86) PCT No.: PCT/IB2020/054835
§ 371 (c)(1),
(2) Date: Nov. 24, 2021

(87) PCT Pub. No.: WO2020/250060
PCT Pub. Date: Dec. 17, 2020

(65) Prior Publication Data
US 2022/0323988 A1    Oct. 13, 2022

(30) Foreign Application Priority Data

Jun. 11, 2019 (IT) .......... 102019000008619
May 11, 2020 (IT) .......... 102020000010576

(51) Int. Cl.
*B05C 19/04* (2006.01)
*B05C 19/02* (2006.01)
(Continued)

(52) U.S. Cl.
CPC .......... *B05C 19/04* (2013.01); *B05C 19/02* (2013.01); *B05C 19/06* (2013.01); *B05D 1/24* (2013.01); *B28B 5/021* (2013.01); *B28B 13/0215* (2013.01)

(58) Field of Classification Search
CPC . G01F 13/00–003; B05C 19/04; B05C 19/06; B05B 1/08; B05B 7/1486
See application file for complete search history.

(56) References Cited

U.S. PATENT DOCUMENTS 3,741,789 A    6/1973   Young et al.
4,692,068 A *  9/1987   Hanrot ............... C25C 3/14
                                                 406/123
(Continued)

FOREIGN PATENT DOCUMENTS

CN    86100066 A    7/1986
CN    1062705 A     7/1992
(Continued)

OTHER PUBLICATIONS

Chinese Office Action from corresponding Chinese Patent Application No. 202080042869.6, dated May 26, 2023, 9 pages.

(Continued)

*Primary Examiner* — Dah-Wei D. Yuan
*Assistant Examiner* — Stephen A Kitt
(74) *Attorney, Agent, or Firm* — Chrisman Gallo Tochtrop LLC

(57) ABSTRACT

A dispensing device for dispensing a granular material, comprising a dispensing channel (20) provided with an inlet opening (21) and an outlet opening (22). The dispensing channel (20) comprises an intermediate portion (23), which connects the inlet (21) and outlet (22) openings and is provided with a longitudinal axis (Y); the intermediate portion (23) has a length (L) and a height (H), measured on (Continued)

a vertical plane containing the longitudinal axis (Y), wherein the height (H) is measured perpendicular to the length (L). The intermediate portion (23) is configured to enable the deposit and accumulation of a predetermined quantity of granular material coming from the inlet opening (21); Motor means are provided which can be activated on command to cause the granular material to flow in advancement from the intermediate portion (23) towards the outlet opening (22).

20 Claims, 12 Drawing Sheets

(51) Int. Cl.
  *B05C 19/06* (2006.01)
  *B05D 1/24* (2006.01)
  *B28B 5/02* (2006.01)
  *B28B 13/02* (2006.01)

(56) References Cited

U.S. PATENT DOCUMENTS

| | | | |
|---|---|---|---|
| 5,299,694 A | 4/1994 | Rambaud | |
| 7,178,459 B2 | 2/2007 | Stefani | |
| 8,333,916 B2 | 12/2012 | Jamrussamee et al. | |
| 8,425,159 B2 | 4/2013 | Roumieu et al. | |
| 11,167,445 B2 | 11/2021 | Stefani | |
| 2002/0160108 A1* | 10/2002 | Aschenbeck | E04D 1/26 118/201 |
| 2006/0153980 A1* | 7/2006 | Taiana | B05B 7/1486 118/620 |
| 2013/0149471 A1* | 6/2013 | Kim | B05D 1/12 427/180 |
| 2018/0250846 A1 | 9/2018 | Stefani | |

FOREIGN PATENT DOCUMENTS

| | | | |
|---|---|---|---|
| CN | 1671528 A | 9/2005 | |
| CN | 101186080 A | 5/2008 | |
| CN | 101422766 A | 5/2009 | |
| CN | 101754918 A | 6/2010 | |
| CN | 202213038 U | 5/2012 | |
| CN | 103958073 A | 7/2014 | |
| CN | 109336617 A | 2/2019 | |
| EP | 1175984 A2 | 1/2002 | |
| GB | 1318584 | 5/1973 | |
| WO | WO-0172489 A2 * | 10/2001 | B05B 7/1495 |
| WO | 2009118611 A1 | 10/2009 | |
| WO | 2017051275 A1 | 3/2017 | |

OTHER PUBLICATIONS

Chinese Office Action issued Dec. 16, 2022 in Chinese Patent Application No. 202080042869.6, 8 pages.

* cited by examiner

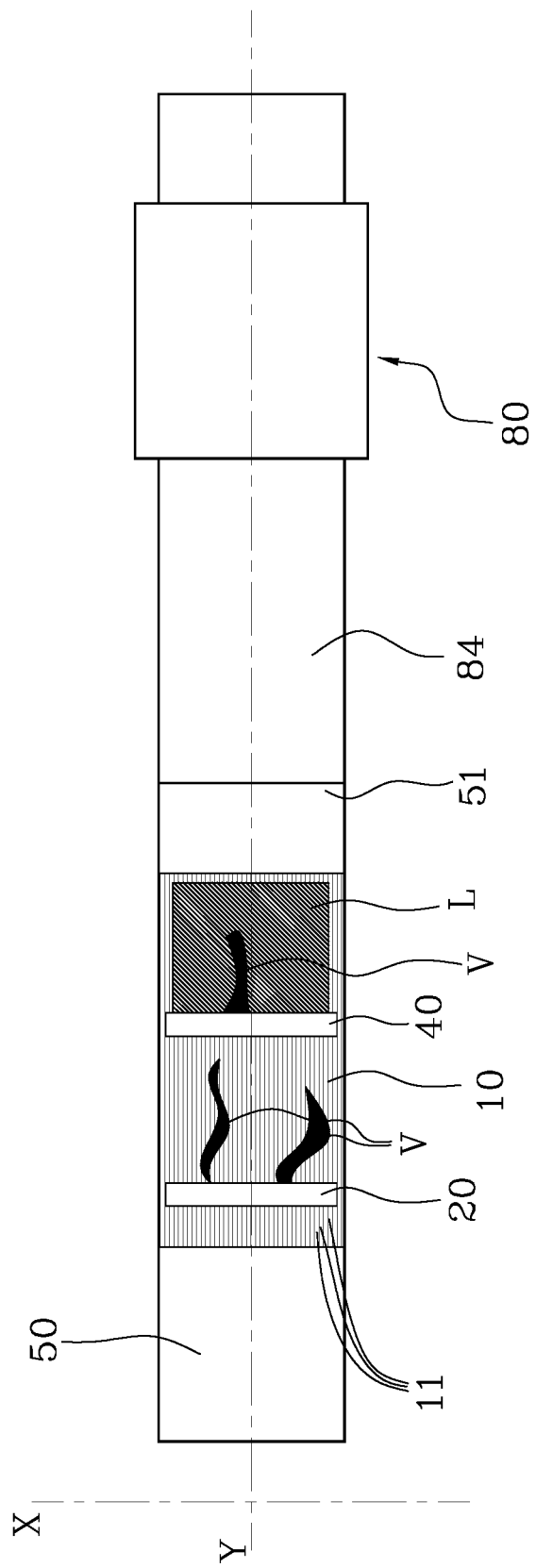

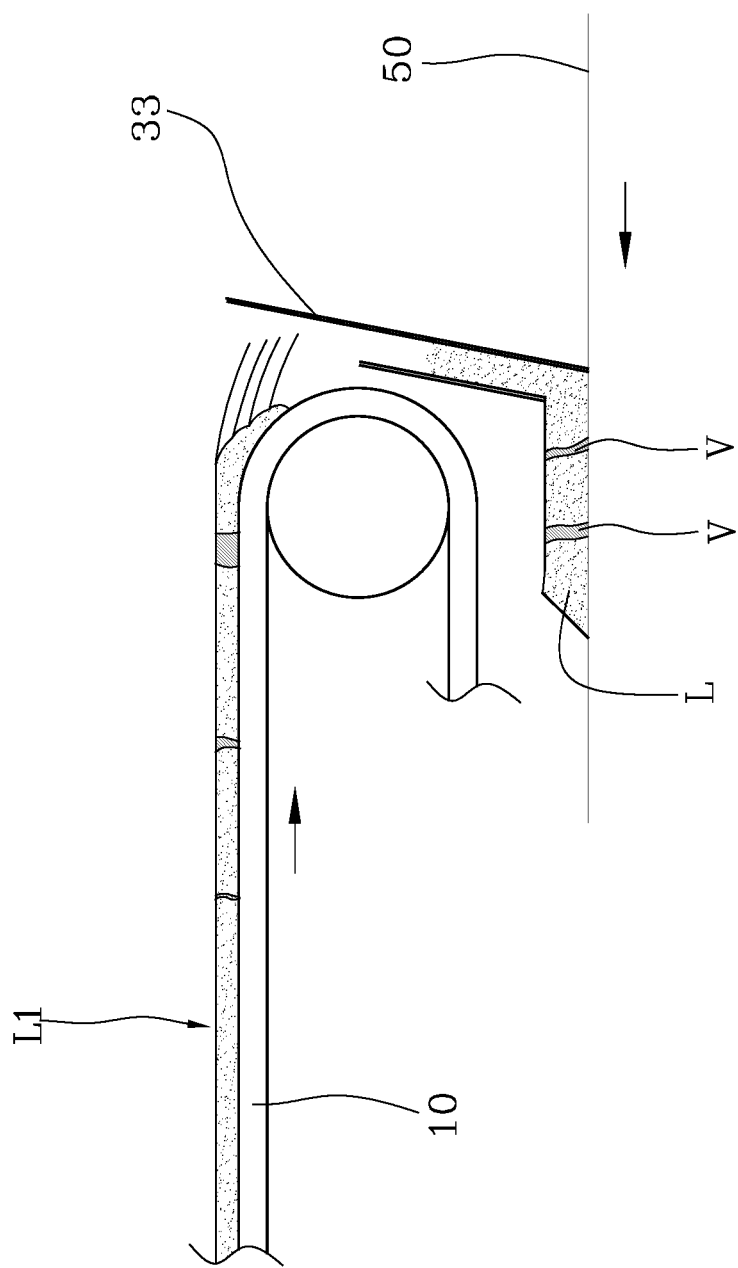

DISPENSING DEVICE FOR A GRANULAR MATERIAL

The present invention relates to a dispensing device for materials in powder or granule form.

In particular, the invention relates to a dispensing device which allows the controlled deposit of a granular or powdered material.

The invention is useful for the decoration of ceramic tiles.

As is known, the decoration of ceramic tiles substantially occurs with two main techniques.

A first technique involves applying the decoration on the raw tile by means of ink jet printers. The decoration is applied on the tile after pressing and before firing.

A second technique involves applying the decoration, always in a step prior to firing the tile, in the form of granular or powdered material.

In this second technique, the granular or powdered material which forms the decoration is deposited by means of devices of varying nature.

Some of the devices currently used involve the deposit of the material by gravity, through unloading openings provided with a closure means which can be operated in a controlled manner. The current devices, even those of a more complex type, do not however allow precisely controlling the amount or the position of the material deposited. The current devices, in substance, are only useful for realizing decorations in the form of relatively imprecise shading or veining.

The object of the present invention is to offer a dispensing device for granular or powdered materials that allows overcoming the drawbacks of the currently available devices.

An advantage of the dispensing device according to the present invention is that it allows a very precise deposit of the material.

Another advantage of the dispensing device according to the present invention is that it has no moving mechanical members for controlling the dispensing of the powdered material.

Another advantage of the device is that it is very compact and lightweight, suited to be moved and positioned with ease.

A further advantage of the device, due to its compact size, is that of being able to be used in a relatively high number of items, to speed up the application of the decoration.

Further characteristics and advantages of the present invention will become more apparent in the following detailed description of an embodiment of the present invention, illustrated by way of non-limiting example in the attached figures, wherein:

FIG. 5 shows a plan view of the machine of FIG. 4;

FIG. 6a shows an enlarged view of zone III of FIG. 4;

Figure 7:
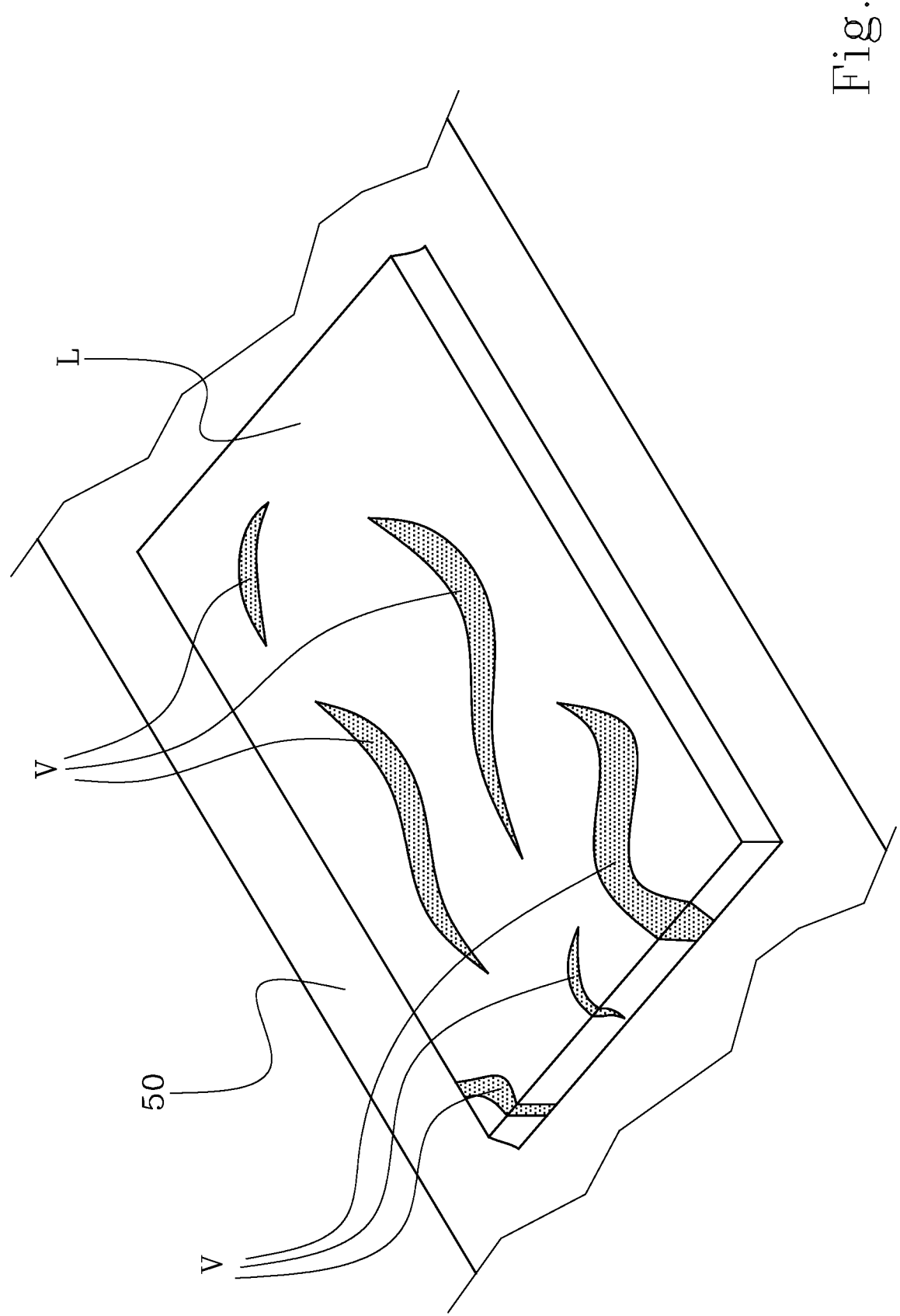

FIG. 7 schematically shows a layer of material deposited with the machine according to the present invention.

The dispensing device (2) according to the present invention lends itself particularly well to the controlled dispensing of an incoherent material, in granular or powdered form. An example of a material which can advantageously be dispensed through the device according to the present invention is atomised ceramic. In the following description, the incoherent material will be generically indicated as "product".

The dispensing device (2) according to the present invention comprises a dispensing channel (20). The dispensing channel has an inlet opening (21), for feeding the product, and an outlet opening (22) for dispensing the product. The inlet (21) and outlet (22) openings may have different profiles. In the illustrated preferred but not exclusive embodiment, the openings (21,22) have an elongated quadrangular profile, i.e., they are in the form of slots. This configuration of the inlet and outlet openings (21,22) allows two or more dispensing devices (2) to be compactly arranged side by side to one another.

Preferably the outlet opening (22) is positioned at the end of an outlet portion (22a) of the dispensing channel (20) which has a longitudinal axis (X) inclined so as to allow the granular material to flow by gravity through the outlet opening (22). For example, the outlet portion (22a) is oriented vertically. Likewise, the inlet opening (21) also has a longitudinal axis (X) oriented so as to facilitate the entry of the granular material by gravity. For example, the inlet opening (21) is positioned at the end of an inlet portion (21a) oriented vertically. Furthermore, the inlet portion (21a) is shaped like a hopper, i.e., it has a decreasing section from the top down. In the embodiment shown, the inlet portion (21a) and the outlet portion (22a) have, on a section plane perpendicular to the respective longitudinal axis (X), an elongated rectangular contour. The embodiment shown in the figures offers the advantage of allowing the side by side arrangement of multiple outlet openings (22) and multiple inlet openings (21) in a compact configuration.

The dispensing channel (20) comprises an intermediate portion (23) which has a longitudinal axis (Y). In the embodiment shown, the intermediate portion is concentric to the longitudinal axis (Y) thereof. Preferably, on a section plane perpendicular to the longitudinal axis (Y) thereof, the intermediate portion has a rectangular contour. In the embodiment shown, the intermediate portion (23), the inlet portion (21a) and the outlet portion (22a) have the same width, measured on a section plane perpendicular to the longitudinal axis (X) of the intermediate portion. This allows a homogeneous flow of the granular material.

On a vertical plane containing the longitudinal axis (Y), the intermediate portion has a length (L), measured as the minimum distance between the edges of the inlet (21) and outlet (22) openings, and a height (H), measured perpendicular to the length (L). For example, the height (H) is measured between a junction zone or edge (E) between the inlet opening (21) and the intermediate portion (23), and a bottom wall (23a) of the intermediate portion (23).

The intermediate portion (23) is configured to enable the deposit and accumulation of a predetermined quantity of granular material coming from the inlet opening (21). In other words, the intermediate portion (23) is configured so that the granular material, fed to the inlet opening (21), deposits and accumulates in the intermediate portion (23)

and, in the absence of further stresses, does not flow along the intermediate portion (23) towards the outlet opening (22).

In the preferred but not exclusive embodiment shown, the intermediate portion (23) has an inclination, with respect to a horizontal plane, a height (H) and a length (L) that are such as to halt by force of gravity the flow of the material from the inlet opening (21) towards the outlet opening (22).

The principle for configuring the intermediate portion (23) so that it can allow the deposit and accumulation of granular material, i.e. so that it can stop the flow of granular material from the inlet opening (21) towards the outlet opening (22), takes into account the internal angle of repose (a) of the granular material. As is well known, a granular material, when deposited by gravity on a horizontal plane, forms a conical pile whose basic angle is precisely called the "angle of repose" or "angle of shear strength".

The internal angle of repose (a) is measured with respect to the bottom wall (23a) of the intermediate portion (23).

For example, with the internal angle of repose (a) of the granular material known, the height (H) multiplied by the cotangent of the internal angle of repose (a) is smaller than the length (L) of the intermediate portion (23):

$$H \times ctg(a) < L$$

Figure 3:
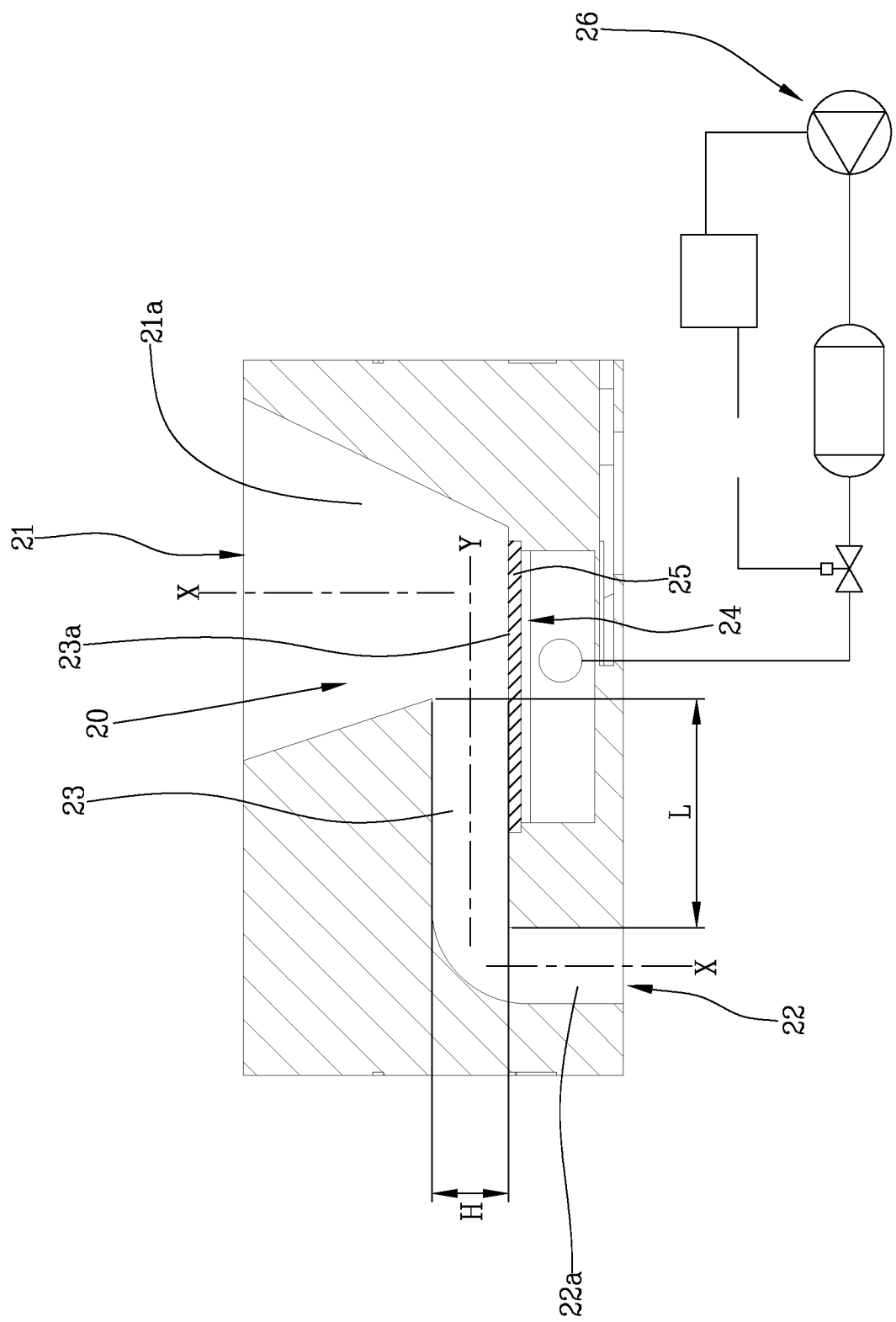
FIG. 3 shows a sectional view of the dispensing device of FIG. 2, according to the plane A-A of FIG. 2.
Figure 3A:
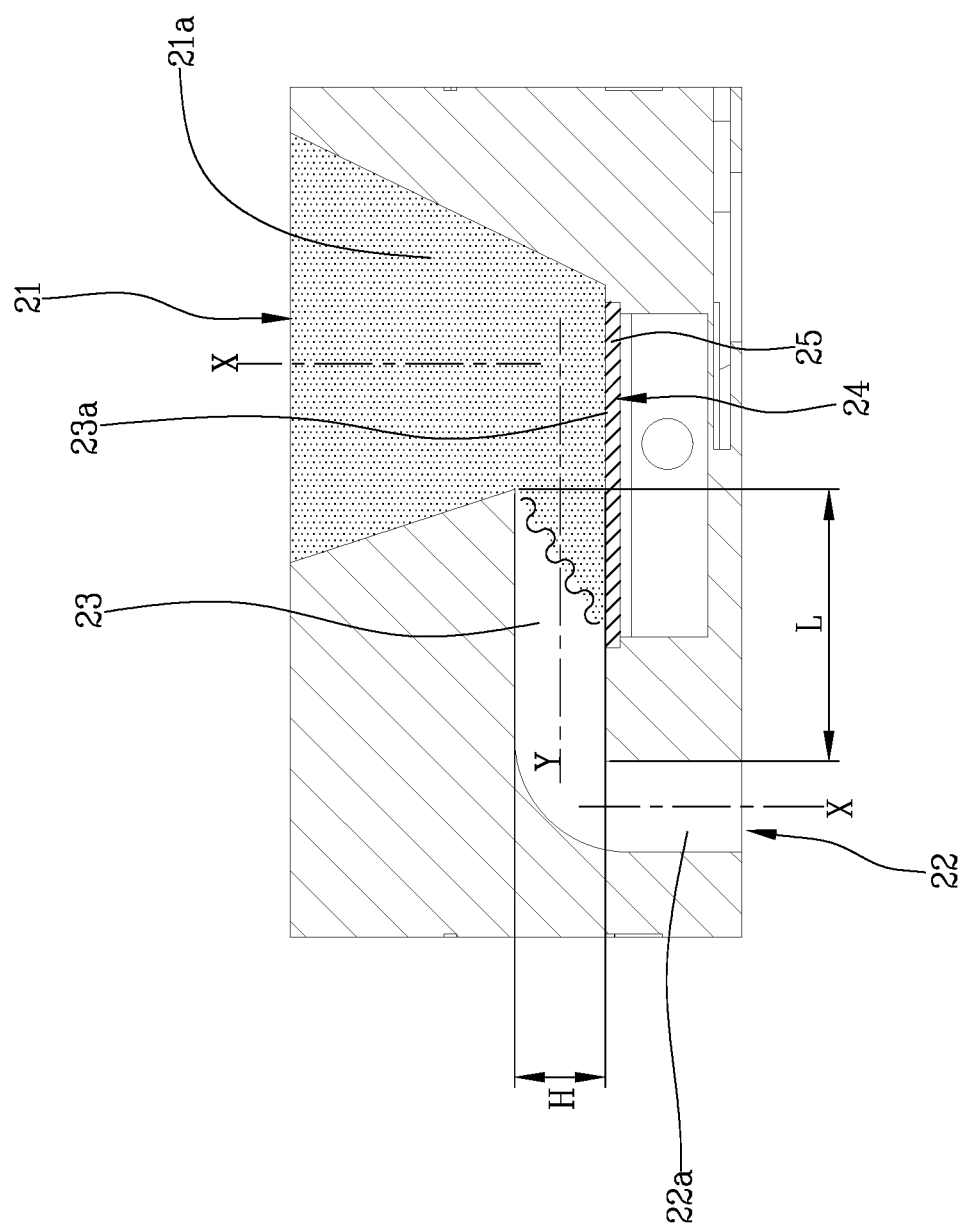
FIG. 3a shows the view of FIG. 3 in which the granular material is schematically shown.

In this way, the granular material coming from the inlet opening (21) is arranged resting and accumulates on the bottom of the intermediate portion (23), without being able to reach the outlet opening (22), as shown in FIG. 3a.

The intermediate portion (23) is therefore misaligned with respect to the inlet opening (21) and the outlet opening (22), i.e. the inlet opening (21), the intermediate portion (23) and the outlet opening (22) are not concentric with one another. In the embodiment shown, the bottom wall (23a) of the intermediate portion (23) has a substantially horizontal inclination.

The shape of the intermediate portion (23) therefore allows to halt the flow of the granular material, i.e., to prevent the dispensing of the material itself, without the need for mechanical opening/closing members that, in addition to being expensive and problematic to control, can damage the granular material.

To allow the flow of granular material from the intermediate portion (23) towards the outlet opening (22), the dispensing device (2) comprises motor means. These motor means can be activated on command to cause the granular material to flow in advancement from the intermediate portion (23) towards the outlet opening (22). In essence, the action of the motor means advances the granular material along the intermediate portion (23) to the outlet portion (22a), through which the granular material falls by gravity passing through the outlet opening (22).

In one possible embodiment, the motor means comprise a vibrating device, arranged to transmit controlled vibrations to the intermediate portion (23). The vibrations transmitted to the intermediate portion (23) are such as to cause the granular material to flow towards the outlet opening (22).

In the preferred but not exclusive embodiment shown, the motor means comprise pneumatic means (24,25,26), provided with a blow opening (24) located along the intermediate portion (23). The pneumatic means (24,25,26) can be activated on command to send, inside the intermediate portion (23), an air flow such as to produce the outflow towards the outlet opening (22) of the granular material deposited and accumulated in the intermediate portion (23).

The air flow introduced into the intermediate portion (23) through the blow opening (24) fluidizes and drags the granular material towards the outlet opening (22), through which the granular material is dispensed to the outside. In the embodiment shown, once the outlet opening (22) has been reached, the granular material falls downwards by gravity.

Preferably, but not necessarily, the blow opening (24) is located on the lower wall (23a) of the intermediate portion (23). Such positioning of the blow opening (24) causes the air flow to also act to lift the granular material, effectively favouring the flow towards the outlet opening (22). Preferably, a filter (25) is associated to the blow opening (24). The filter (25) is structured to prevent the granular material from entering the blow opening (24). In the embodiment depicted, the dispensing channel (20), the inlet opening (21), the outlet opening (22) and the blow opening (24) are obtained in a body (200), illustrated in FIG. 1.

The pneumatic means (24,25,26) comprise an air supply source (26), for example a compressor, connected to the blow opening (24). The dispensing device (26) is provided with control means that can be activated on command to send an air flow to the blow opening (24). In one possible embodiment, the air supply source (26) is connected to a storage tank, in turn connected to the blow opening (24) through a supply conduit. This supply conduit is provided with a solenoid valve, associated with a control module which, according to a defined time cycle, commands the opening and closing of the solenoid valve to determine the dispensing of the granular material through the outlet opening (22).

The motor means can be provided with a vibrating unit (60), associated with the intermediate portion (23) and provided to transmit a controlled vibration to the intermediate portion (23). The vibrating unit (60) can be activated simultaneously or independently of the pneumatic means (24,25,26). For example, the vibrating unit (60) may be equipped with its own motor, of electromechanical or pneumatic type, operable independently of the pneumatic means (24,25,26).

The intervention of the vibrating unit (60) is particularly advantageous and effective in the presence of a product of relatively high particle size, for example a flaked product, with respect to which the only effect produced by the pneumatic means may not be entirely sufficient.

Figure 3B:
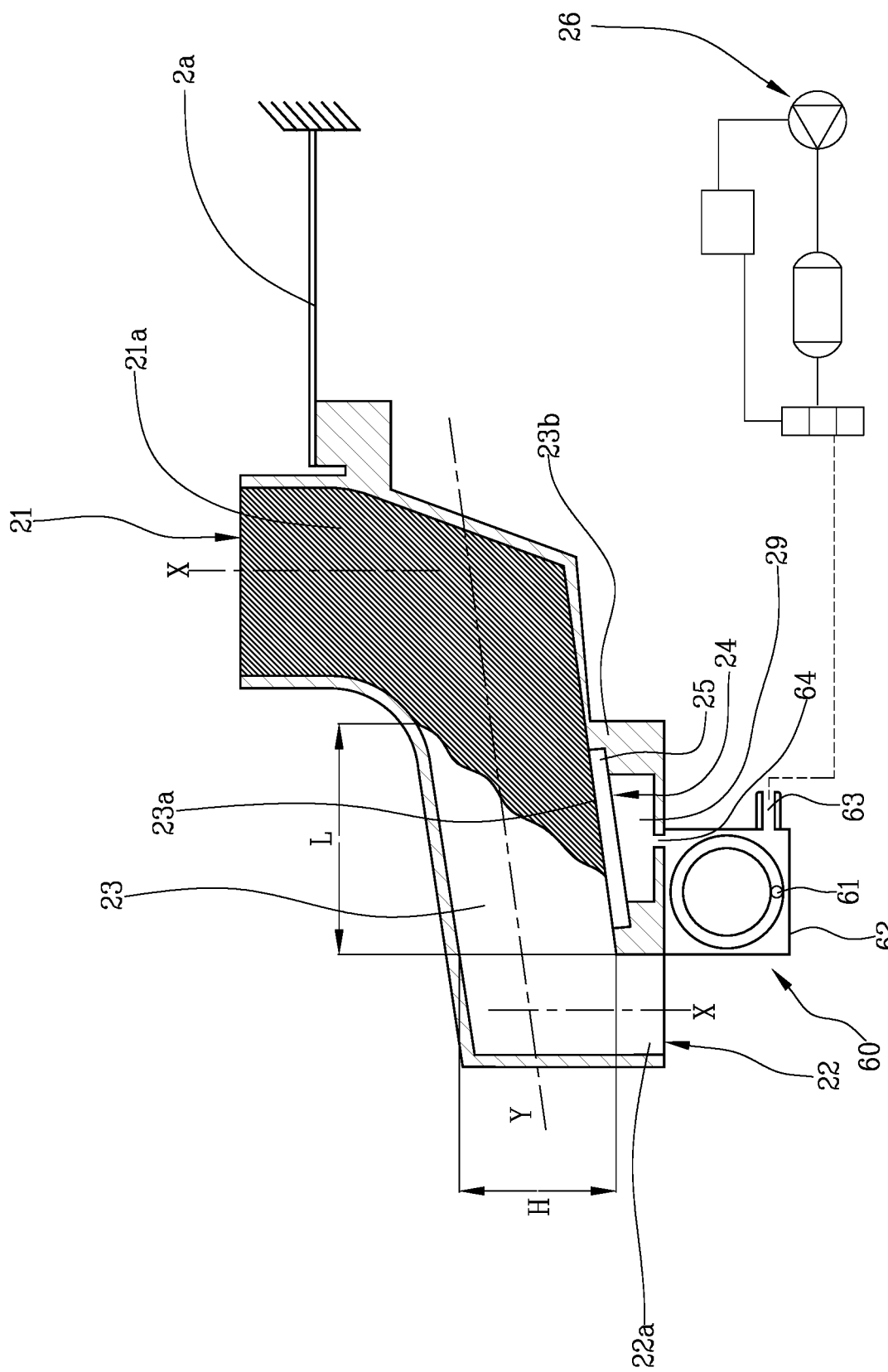
FIG. 3b shows a second embodiment of the dispensing device according to the present invention.
Figure 3C:
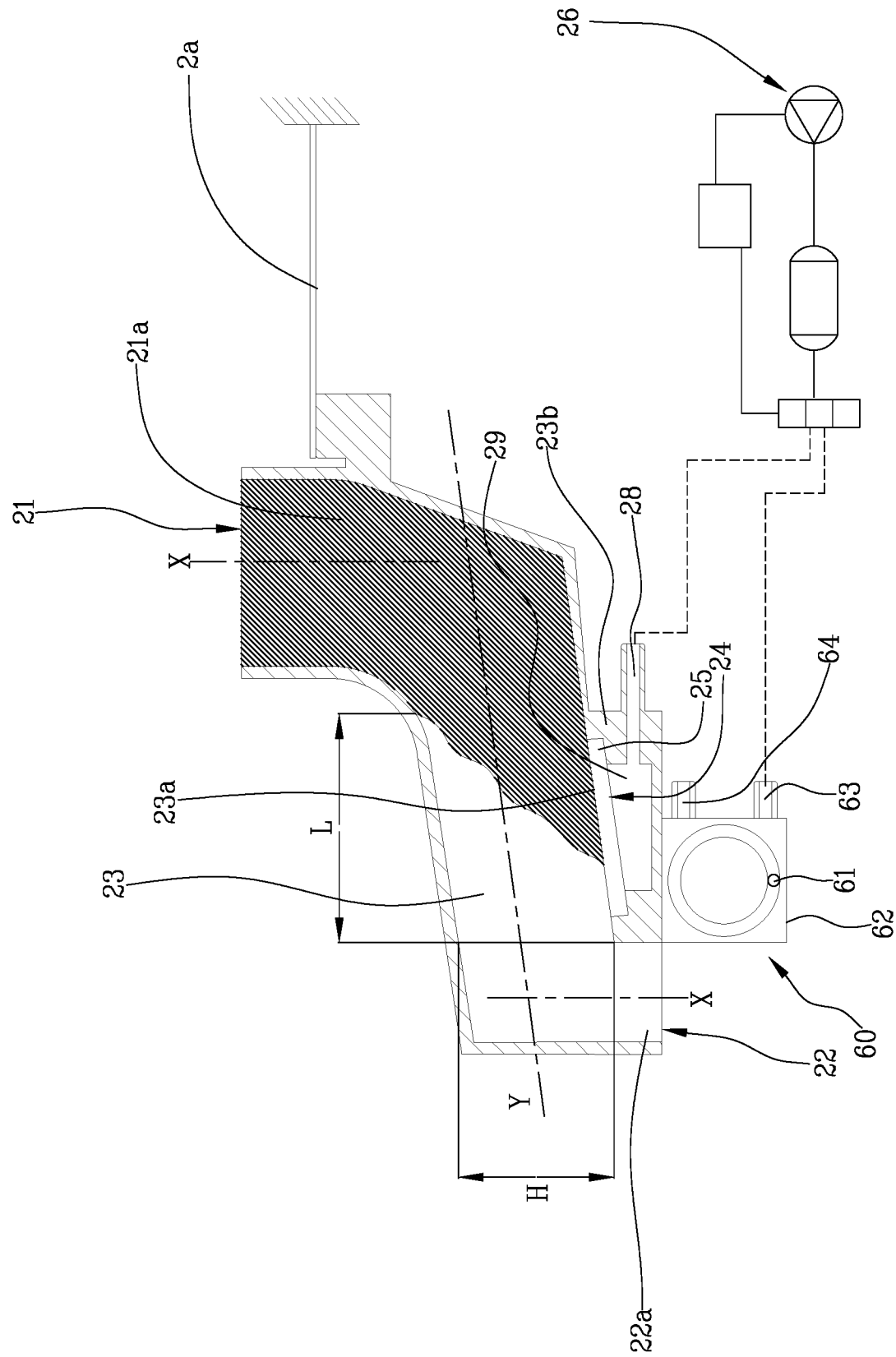
FIG. 3c shows a third embodiment of the dispensing device according to the present invention.

In the preferred but not exclusive embodiment shown in FIGS. 3b and 3c, the vibrating unit (60) comprises a mass (61) movable inside a container (62). The mass (61) is movable with eccentric or unbalanced motion with respect to the container (62), so as to produce vibratory stresses that are transmitted to the intermediate portion (23). In the embodiment shown, the mass (61) is movable inside the container (62) with a circular motion, along a substantially circular trajectory. In this way, the mass (61) transmits to the container (62), for example to a wall or other constraint, a circular force whose direction is rotating about the centre of the trajectory followed by the mass (61) itself. The container (62), directly or indirectly associated with the intermediate portion (23), transmits to the latter the vibrations produced by the motion of the mass (61). In the embodiment shown, the container (62) is provided with a circular line or track, along which the mass (61) is movable. Preferably the mass (61) is in the form of a sphere. Preferably, the dispensing device (2) is constrained to a structural support part, which may be a part of a more complex deposition device or decorative machine, by means of an elastic suspension or connection (2a), to facilitate the establishment of the vibratory stresses on the intermediate portion (23).

The container (62) is provided with at least one supply opening (63) connectable to an air supply source (26), and at least one outlet opening (64). This allows the mass (61) to be actuated by means of an air flow that can be activated on command. In particular, the supply opening (63) is obtained through a wall of the container (62) and faces tangentially to the trajectory followed by the mass (61). For example, the supply opening (63) delimits a short conduit whose longitudinal axis is oriented substantially tangential to the circular trajectory of the mass (61). In this way, an air flow, provided with sufficient energy, is able to transmit to the mass (61) a pulse such that it flows along the circular path enclosed by the container (62).

The outlet opening (64) is also in communication with the path followed by the mass (61). In particular, the outlet opening (64) opens onto the circular track along which the mass (61) flows. With each track travelled, the mass (61) occludes the outlet opening (64), so that the outflow of air from the latter has a pulsed trend. This is particularly advantageous in the embodiment shown, in which the outlet opening (64) is placed in communication with the blow opening (24). In fact, the pulses of the outflow of air from the outlet opening (64) are added to the vibrations produced by the mass (61), accentuating the fluidizing effect of the product accumulated in the intermediate portion (23), especially in the presence of large granules or flakes.

In the embodiment shown in FIG. 3b, the outlet opening (64) and the blow opening (24) are connected to each other. In this way, by means of a single air supply through the inlet opening (63), it is possible to activate the vibrating unit (60) and supply the blow opening (24) for the fluidification of the product. For example, the outlet opening (64) and the blow opening (24) are connected to one another through a volume (29). The volume (29) is laterally delimited by a protruding portion (23b) of the wall delimiting the intermediate portion (23). This protruding portion (23b) also delimits the blow opening (24) and defines a casing for the filter (25). The volume (29) is delimited by the casing (62) below.

The embodiment shown in FIG. 3c differs from that illustrated in FIG. 3b in that the outlet opening (64) is not in communication with the blow opening (24), but is independent of the latter. In this way, the activation of the vibrating unit (60), i.e. sending an air flow to the supply opening (63), does not affect the air supply at the blow opening (24).

Figure 3D:
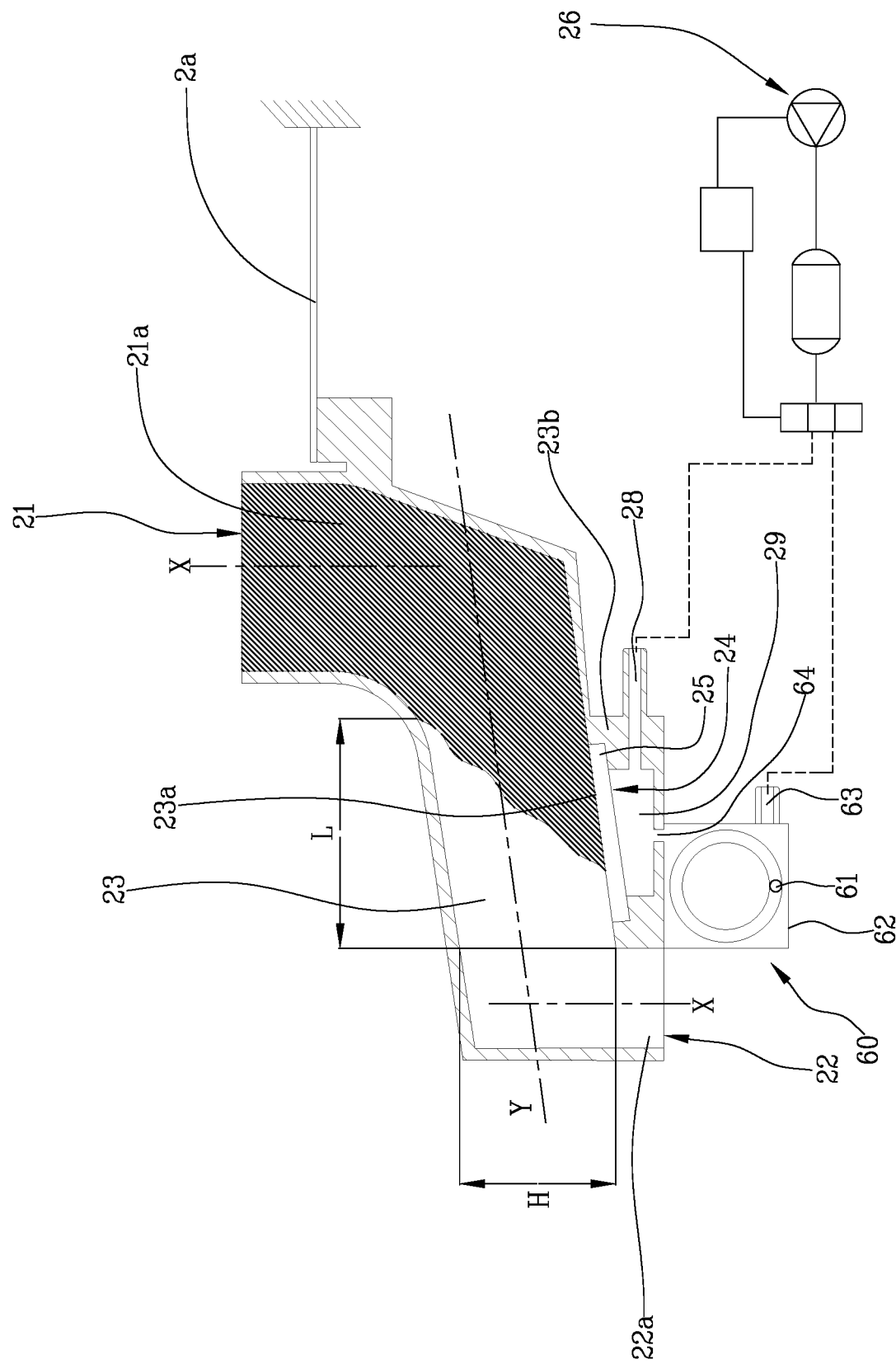
FIG. 3d shows a fourth embodiment of the dispensing device according to the present invention.

In a further variant, shown in FIG. 3d, the blow opening (24) is connected to a second supply opening (28), independent of the supply opening (63). In the embodiment shown, the second supply opening (28) is connected to the volume (29), i.e. opens onto the volume (29).

The air supply source (26) may be connected, on command, to the blow opening (24) or the supply opening (63) or both. The direct connection between the source (26) and the blow opening (24) is obtained by means of the second supply opening (28) connected to the blow opening (24). By means of a four-way pneumatic distributor (D) and at least three positions, of a type known in the art, it is possible to selectively communicate the source (26) with only the supply opening (63), with only the blow opening (24), via the second supply opening (28), or with both.

The activation/deactivation of the motor means according to a predetermined time cycle allows varying the amount of dispensed product in a very precise manner. For example, it is possible to dispense the product in small subsequent amounts, defined through corresponding activation/deactivation cycles of the motor means.

The activation/deactivation of the motor means, determined through the source (26), can be in on/off mode, with work cycles controllable in frequency, in proportional mode (as a function of on one or more parameters related to the product dispensing needs), and/or by adjusting the activation cycles independently between the vibrating unit (60) and the blow opening (24).

In all the solutions described, stopping the flow of material along the intermediate portion (23) can be controlled not only by deactivating the motor means, i.e., deactivating the air supply source (26), but also by creating a vacuum in the blow opening (24), i.e., activating the source (26) in an intake mode. This intake mode can be achieved in a manner known in the art, for example by means of a Venturi conduit. A vacuum at the blow opening (24) results in a very rapid halt of the flow of material along the intermediate portion (23).

In any case, controlling the dispensing of the granular material does not require the intervention of mechanical shutters, with the same advantages already indicated above.

The dispensing device according to the present invention can be used to deposit the product, in a controlled manner, on an underlying plane or an underlying surface. Both the dispensing device and the deposit plane of the product can be movable through suitable motors.

For example, the dispensing device can be used to deposit the product on a movable conveyor plane, in predetermined positions and amounts. The movable plane can be driven in motion along a conveying direction, while the dispensing device can be translated along a direction horizontal and perpendicular to the conveying direction of the movable plane, and possibly also along a direction parallel to the conveying direction of the movable plane.

A predetermined number of dispensing devices according to the present invention can be arranged along an alignment direction, arranged side by side, to realize a dispensing bar of predetermined length. By realizing an outlet opening (22) in a flattened form, as shown in the figures, it is possible to arrange the dispensing devices relatively close together, bringing the outlet openings (22) closer to each other. This printing bar allows defining a dispensing front extended along the alignment direction of the dispensing devices. For example, in the case summarized above of deposit on an underlying movable plane, the printing bar arranged with the alignment direction of the dispensing devices perpendicular to the conveying direction of the movable plane substantially allows depositing the product over the entire width of the movable plane, understood as an extension measured perpendicular to the conveying direction.

Figure 4:
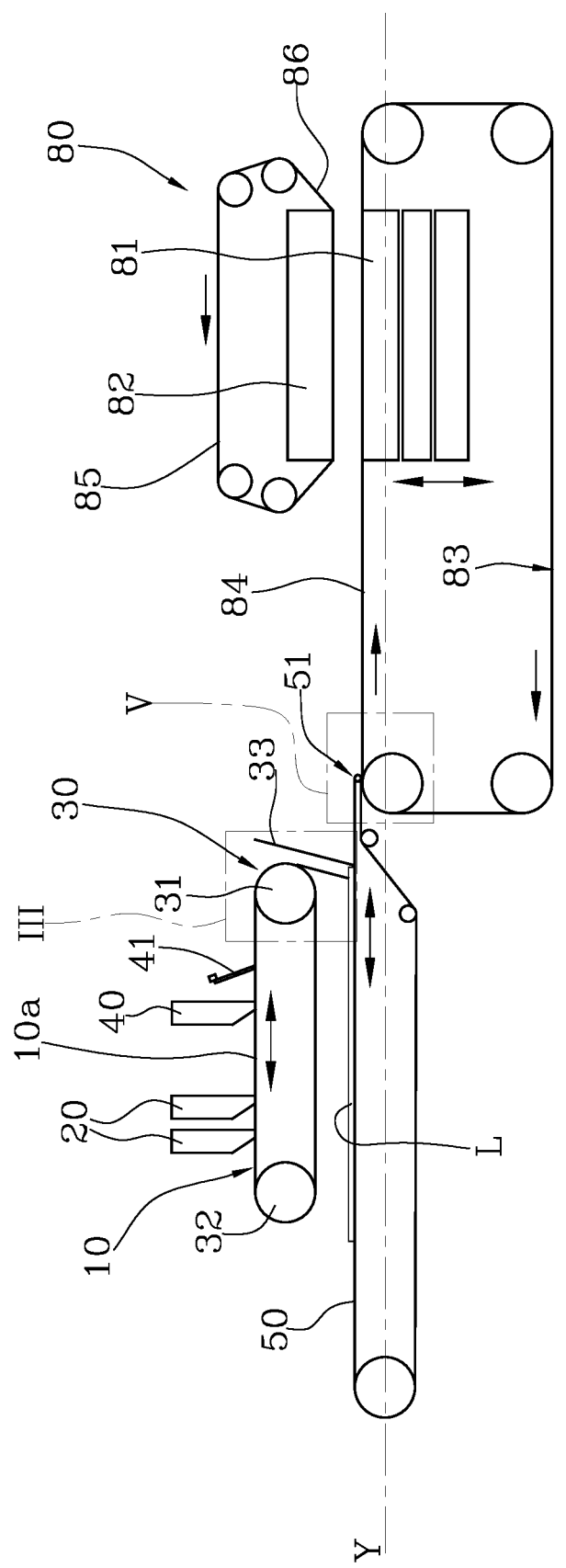
FIG. 4 shows a schematic and vertical elevation view of a decorating machine according to the present invention.

The possibilities of use synthesized above are particularly advantageous for a machine for the dry decoration of ceramic tiles, illustrated in FIGS. 4, 5 and 6.

The machine comprises a support element (10), provided with a plurality of cavities (11) of predetermined shape and depth or height. Each of these cavities (11) has an opening that allows the entry of the product and a subsequent unloading of the product previously introduced. Each cavity (11) is delimited by a side wall and a bottom which can be substantially flat or curved. In the embodiment shown, the cavities (11) have a rhomboidal contour, but other forms are obviously possible. In a preferred but not exclusive embodiment, the cavities (11) comprise a plurality of elongated grooves, parallel to each other. These elongated grooves have a closed bottom and are delimited laterally by two walls, which can be parallel or inclined to each other, converging towards the bottom. In one possible embodiment, the elongated grooves have, on a transverse plane, a V-section. Preferably, the cavities (11) are adjacent to one another. Furthermore, the cavities (11) occupy the entire surface of the intermediate element (10). This promotes the filling of the cavities (11) themselves.

The cavities (11) are adjacent to one another along the sides thereof, so as to be separated by a relatively thin edge. Each of the cavities (11) defines a volume suitable to receive a predetermined amount of product for the decoration to be realized. Each cavity (11) can be filled in an independent manner from the others.

The machine comprises at least one dispensing device (2) according to the present invention, arranged to deposit a predetermined quantity of product inside one or more predetermined cavities (11).

The dispensing device (2) can be provided with the possibility of moving with respect to the cavities (11), i.e. with respect to the support element (10). In particular, the dispensing device (2) is able to move such that it can dispense the product inside any of the cavities (11). Preferably, but not necessarily, both the cavities (11), by means of the support element (10), and the dispensing device (2) are provided with the possibility of translating along at least one direction of displacement.

In a possible embodiment, the machine comprises multiple dispensing devices (2), each of which can contain a colour or a mixture of predetermined colours. Each dispensing device (2) can be individually controlled to open and close in order to dispense the product in one or more pre-selected cavities (11).

As already mentioned, it is possible to arrange a predetermined number of dispensing devices (2) according to the present invention along an alignment direction, arranged side by side, to realize a dispensing bar of predetermined length. This printing bar allows defining a dispensing front extended along the alignment direction of the dispensing devices. For example, the dispensing devices can be aligned along a direction parallel to the transverse direction (Z).

The printing bar arranged with the alignment direction of the dispensing devices (2) parallel or inclined with respect to the transverse direction (Z), and sufficiently extended, substantially allows depositing the product over the entire width of the support element (10), intended as extension measured parallel to the transverse direction (Z), except for a possible limited transverse movement.

The machine according to the present invention further comprises an unloading device (30), arranged to move the cavities (11) from a loading position, in which they can receive the product from the dispensing device (2), to an unloading position, in which they can unload the product.

In a particularly advantageous embodiment, the unloading device (30) is structured to move the cavities (11) between a loading position, in which they are facing upwards to receive the product from the dispensing device (2), and an unloading position in which they are facing at least partially downwards to unload the product essentially by gravity.

In the preferred but not exclusive embodiment shown, the support element (10) is in the form of a flexible belt. The unloading device (30) comprises a pair of rollers (31,32) around which the support element (10) is wound, so as to define a closed loop path. The cavities (11) are facing towards the outside of said closed path.

Along the path defined by the rollers (31,32) the support element (10) has an upper section (10a), along which it slides forwards along the longitudinal direction (T) and along which the cavities (11) are facing upwards, in the loading position. The dispensing device (2) can be placed at the top of the support element (10), i.e. above the upper section of the support element (10), so as to be able to unload the product downwards and towards the cavities (11).

As already indicated, the rollers (31,32) cause the support element (10) to slide along a closed path so as to progressively displace the cavities (11) from the loading position to the unloading position. In the passage from the loading position to the unloading position, the cavities (11) pass from a position in which they are facing upwards to a position in which they are facing downwards. During this passage, each cavity (11) can pour its content downwards. The passage of the cavities (11) from the loading position to the unloading position takes place progressively along the section of the support element (10) that turns around a first roller (31). When each cavity (11) is located facing downwards, i.e. after having travelled around the first roller (31), the pouring of its content is substantially complete. Turning around the second roller (32), the cavities (11) will move back into the loading position, to receive a new load of product.

The loading of the cavities (11) can occur by combining a forward movement of the support element (10) along a longitudinal direction (T) with a displacement movement of the dispensing device (2) along a transverse direction (Z), perpendicular to the longitudinal direction (T), as already previously underlined. In substance, while the support element (10) advances, the dispensing device (2), by means of the unloading conduits or nozzles, sends the product to the cavities (11) in a selective and targeted manner, possibly translating along the transverse direction (Z). This allows sending the product contained in the dispensing device towards predetermined cavities (11), and not towards others.

Downstream of the dispensing device (2) a filling device (40) can be provided, equipped with an unloading opening arranged so as to fill the cavities (11) that have not been filled or have been partially filled by the dispensing device (2). The filling device (40) contains a second product which can be different than that dispensed by the dispensing device (2), for example for colour, particle size or other characteristics. The second product, unloaded from the filling device (40), fills the cavities (11) which remained empty or partially empty downstream of the dispensing device (2), and covers the cavities (11) already filled by the dispensing device (2). A doctor blade (41) is arranged in contact with the upper section of the support element (10), downstream of the filling device (40), to remove the product in excess of the depth or height of the cavities (11), and therefore protrudes from the upper surface of the support element (11). The doctor blade (41) is preferably solidly constrained to the filling device, i.e. is defined by an edge of the filling device (40).

In a possible embodiment, not shown, the unloading device (30) could be positioned in such a way as to unload the product contained in the cavities (11) directly inside the mould of a press.

In the solution shown, a deposit plane (50) is placed below the support element (10), for receiving the product unloaded by the cavities (11). A relative movement is provided between the support element (10) and the deposit plane (50) which is directed along the longitudinal direction (T), which takes place at the same time as the unloading of the product from the cavities (11). This allows depositing the product, unloaded from the cavities (11), in a continuous layer (L) on the deposit plane (50).

The relative movement between the deposit plane (50) and the support element (10) can be obtained, for example, by maintaining the deposit plane (50) stationary and translating the support element (10), solidly constrained to the unloading device (30), along the longitudinal direction (T), i.e. by making the rollers (31,32) translate, and the support element (10) associated thereto, along the longitudinal direction (T), or vice versa.

Figure 1:
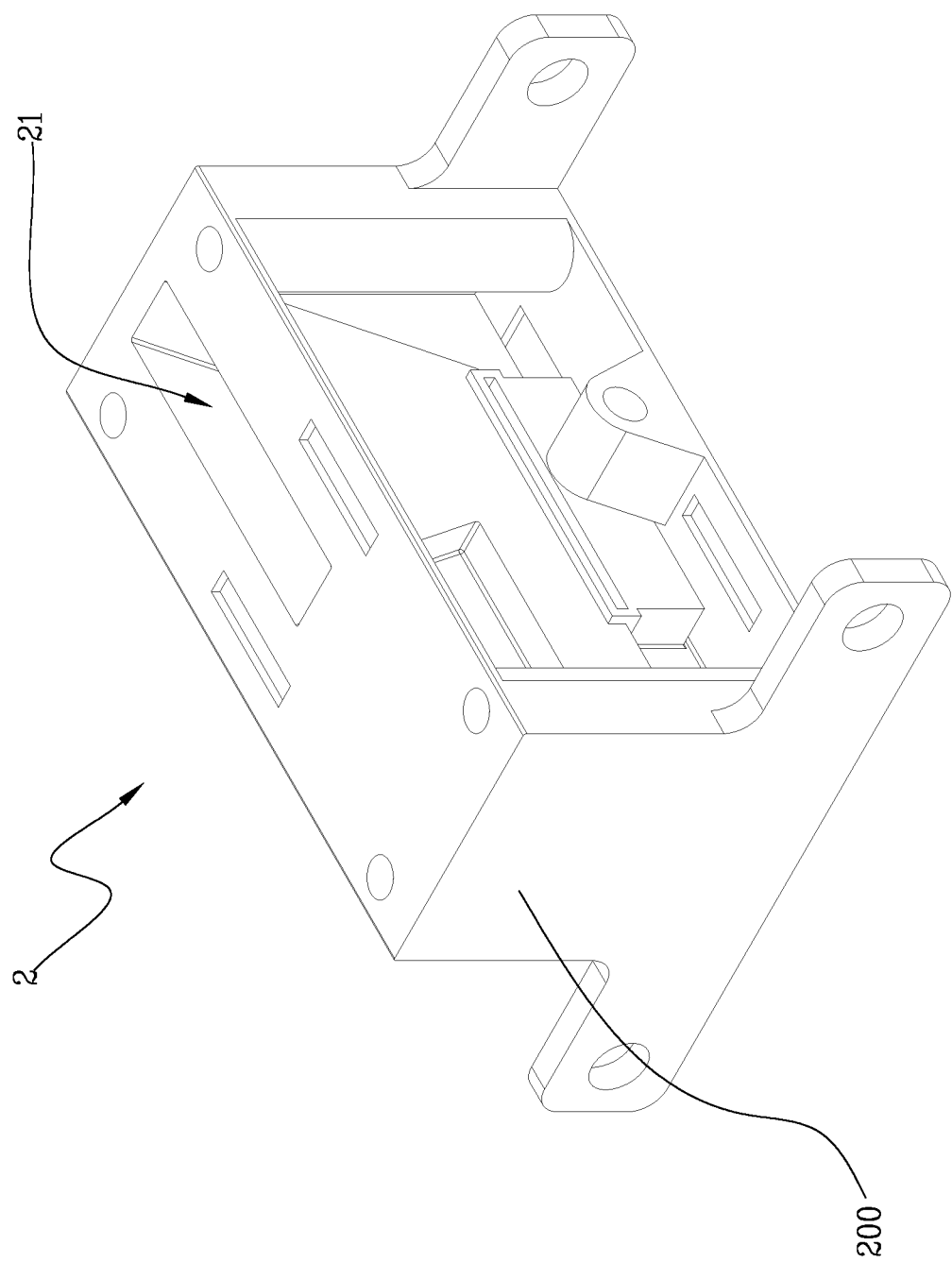
FIG. 1 shows an isometric view of a dispensing device according to the present invention.
Figure 2:
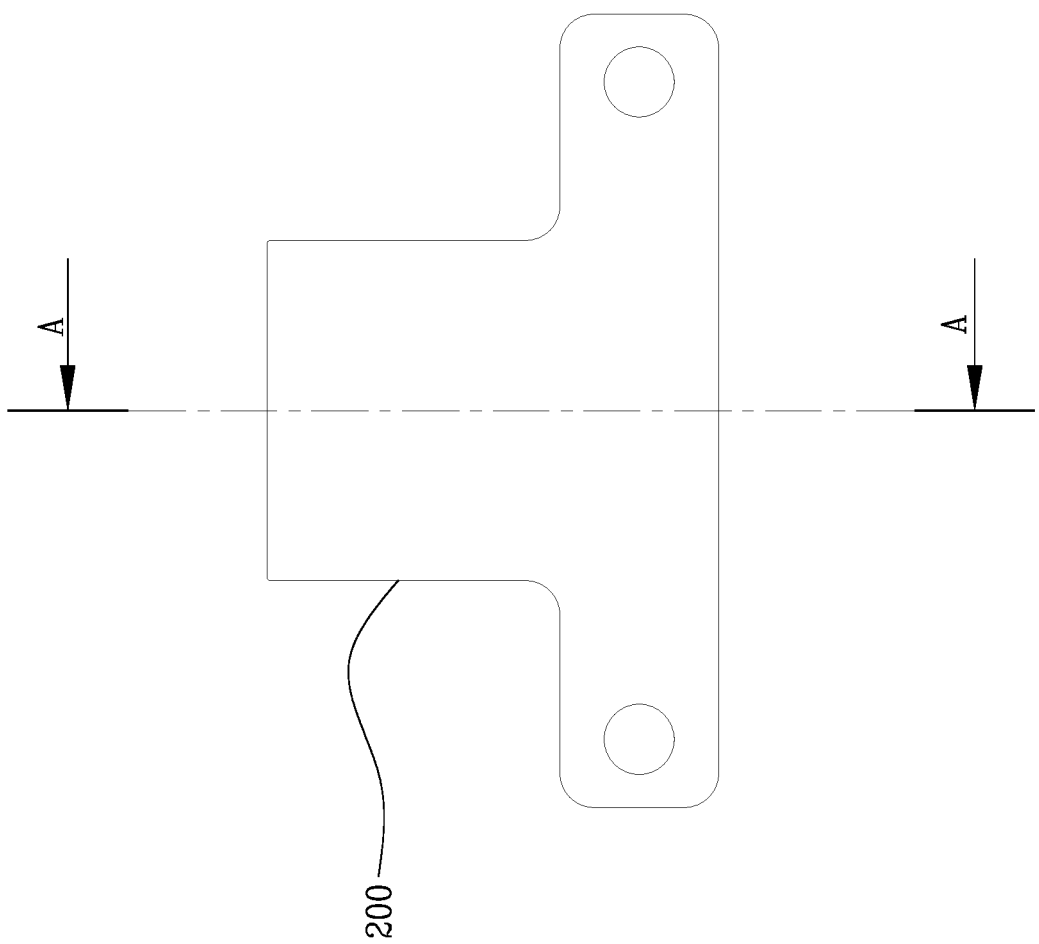
FIG. 2 shows a front view of the dispensing device according to the present invention.

In a preferred embodiment, the relative movement between the deposit plane (50) and the support element (10) is obtained by sliding the deposit plane (50) along the longitudinal direction (T), while the support element (10), despite being slidable along its path around the rollers (31,32), is on the whole static along the direction (T). The sliding of the deposit plane (50) can be in the same direction or in the opposite direction with respect to the sliding of the upper section of the support element (10) in its movement around the rollers (31,32). Preferably, but not necessarily, the deposit plane (50) is in the form of a belt or mat slidably movable along a closed path defined by two or more rollers, as shown in FIG. 1.

In the embodiment shown, the product is unloaded from the cavities (11) and is deposited on the underlying deposit plane (50).

The relative movement between the deposit plane (50) and the support element (10) involves the deposit of the ceramic material in a continuous layer (L). By adjusting the relative speed between the deposit plane (50) and the support element (10) it is possible to adjust the height or thickness of the layer which is formed on the deposit plane (50). In the embodiment shown, in which the unloading device (30) is stationary, this variation can be obtained by varying the sliding speed of the deposit plane (50) and/or the sliding speed of the support element (10).

In a possible embodiment of the machine, a control processor is arranged to control the dispensing device (2) so as to fill the cavities (11) in relation to the decoration (V) which is to be realized in the layer (L). To this end, the control processor is equipped with an algorithm that allows processing an image of the decoration (V) to break it down into a series of volumes of product, of predetermined colour, each of which is attributed to a predetermined cavity (11). The control processor then adjusts the operation of the dispensing device (2) in such a way that each volume is introduced into a predetermined cavity (11). The correspondence between each volume and a respective cavity is established by making known to the control processor the position of each cavity (11), the speed of the support element (10) and the speed of the deposit plane (50), for example by means of an encoder, sensors or optical systems known in the art. In substance, starting from the decoration (V) which is to be realized, the control processor defines the number and the position of the volumes of the material necessary to obtain it, and attributes each volume to a cavity (11), in relation to the position in which the volume contained in the cavity (11) will be unloaded on the deposit plane (50).

In a preferred embodiment of the machine, the sliding of the deposit plane (50) is opposite with respect to the sliding of the upper section of the support element (10) in its movement around the rollers (31,32). This allows arranging the deposit plane (50) below the unloading device (30), so as to contain the overall dimensions of the machine along the longitudinal direction (T). In substance, it is sufficient that one end portion of the deposit plane (50) extends beyond the front end of the support element (10), to allow the deposit of the layer (L), while the remaining part of the deposit plane (50) extends below the unloading device (30).

In order to improve the deposit of the material on the deposit plane (50), conserving the decoration distributed in the cavities (11) by means of the dispensing device (2), it is preferable to minimize the distance between the upper section of the support element (10) and the deposit plane (50). For example, the distance between the upper section of the support element (10) and the deposit plane (50) can be reduced by arranging a first roller (31) of reduced diameter.

To favour the maintenance of the structure of the decoration, it is possible to provide a containment barrier, arranged and shaped in such a way as to intercept the material which is unloaded from the cavities (11), to guide or switch the trajectory thereof in a predetermined way.

The machine according to the present invention can be used to realize a decoration (V) comprising two or more layers overlapping each other. To this end, the machine can be equipped with two or more decorating units each comprising a support element (10), one or more dispensing devices (2) and an unloading device (30), arranged in succession or in such a way as to be able to act in succession with respect to one another. In this possible embodiment, different decorating units can be placed in succession above the deposit plane (50). The first decorating unit of the succession can deposit a first layer of product in the manners already described. The first layer of product, through the deposit plane (50), can be conveyed forwards along the longitudinal direction (T) up to transiting below a second decorating unit which can deposit a second layer of product on the previous one, and so on for as many decorating units as are to be used. Each layer has its own decoration, realized through the dispensing device (2) and the cavities (11) of the relative decorating unit.

The decorations of the various overlapping layers can be aligned with each other in such a way as to obtain a comprehensive decoration (V), distributed in the overall thickness of the various overlapping layers. This thus allows realizing decorations with a veining effect (V) which, concretely, extend for the entire thickness of the overall layer of material, obtained by overlapping the various layers, each provided with its own decoration.

The layer (L) of product unloaded from the cavities (11) is subsequently subjected to pressing, whether it be a layer obtained with a single passage of the machine, or a layer obtained by the overlapping of several successive layers. To this end, as already mentioned, the machine according to the present invention could be arranged so as to unload the cavities (11) inside the mould of a press. Also in this case, the unloading of the material could occur in several overlapping layers.

In the solution shown, the layer of material unloaded from the cavities (11) on the deposit plane (50) is fed to a press (80). For example, the press (80) is in the form of a belt press, known in the sector for the pressing of large-format slabs. A press of this type comprises a bottom punch (81), provided with a pressing surface facing upwards. A top punch (82), provided with a pressing surface facing downwards, is located above the bottom punch. At least one of the two punches is movable nearingly and distancingly to and from the other in order to carry out a pressing of a layer (L) of powdered ceramic material. The press further comprises a movable plane (83), in the form of a flexible belt, which has an active section (84) arranged at least partially between the top punch (82) and the bottom punch (81). The press further comprises a second movable plane (85), in the form of a flexible belt, which has an active section (86) arranged between the active section (84) of the first movable plane (83) and the top punch (82).

The deposit plane (50) of the machine according to the present invention is placed upstream of the movable plane (83), so as to feed to the latter the layer of product unloaded from the cavities (11). The transfer of the layer (L) from the deposit plane (50) to the movable plane (83) preferably takes place according to the solution described in the publication WO2017051275. According to this solution, the deposit plane (50), in the section on which the layer (L) is deposited, is substantially aligned and contiguous, at a higher level, with respect to the active section (84) or the forward section of the movable plane (83), along the longitudinal direction (T).

As can be seen in FIG. 5, the deposit plane (50) comprises a front end (51) that defines an end portion at which the deposit plane (50) defines a return curve. This front end (51) is at least partly overlying a rear end (83*a*) of the movable plane (83).

By activating in the same advancement direction the deposit plane (50) and the movable plane (83), i.e. in the same forward direction, the layer (L) is transferred from the deposit plane (50) to the movable plane (83) performing a modest jump downwards at the front end (51) of the deposit plane (50).

The deposit plane (50) and the movable plane (83) are movable independently of each other, i.e. each of them is provided with its own motor means operable independently of the other. This allows a particularly effective work cycle which considerably limits down times. In fact, when the deposit has been completed on the layer (L) on the deposit plane (50), the latter can be accelerated in the same advancement with the movable plane (83) of the press (80). The two planes (50,83) can be synchronized with one another so that, for example, the transfer of one layer (L) from the deposit plane (50) to the movable plane (83) takes place during the evacuation from the press (80) of an already pressed layer (L), keeping in due consideration the acceleration and deceleration steps necessary. This means that the activation of the movable plane (83) of the press (80) does not have to keep in consideration the deposit step of the layer (L) and can therefore take place at higher speeds with respect to that requested by the deposit of the layer (L).

The deposit of the material from the cavities (11) to the deposit plane (50) and the deposit of the material from the deposit plane (50) to the movable plane of the press (83) takes place from the top downwards, by gravity, along a direction of falling.

Since the support element (10), the deposit plane (50) and the movable plane (83) are in motion with respect to one another, between the falling material and the underlying deposit destination, deposit plane (50) or movable plane (83), a relative motion is produced that has a direct component parallel to the longitudinal direction (T).

Because of this relative motion, a vein of material that should ideally be deposited vertically on a vertical plane parallel to the longitudinal direction (T), is instead deposited inclined, from the top downwards, in the direction of the relative movement. The inclination of the vein is schematically shown in FIG. 6, referring to a decoration or veining (V). Given that two distinct deposits of material are provided, one from the cavities (11) to the deposit plane (50), the other from the deposit plane (50) to the movable plane (83) of the press, it is possible to correct the inclination of the vein of material, and therefore the inclination of the veining (V). To this end, the deposit plane (50) and the movable plane of the press (83) are operated in such a way as to produce relative movements in the opposite direction in the passage of the material from the cavities (11) to the deposit plane (50) and from this to the movable plane (83) of the press.

For example, in the preferred embodiment of the machine, the sliding of the deposit plane (50) is opposite with respect to the sliding of the upper section of the support element (10) in its movement around the rollers (31,32). The relative movement that is produced in the fall of the material from the cavities (11) to the deposit plane (50) is thus directed in a first direction, from right to left in FIG. 6*a*. This causes the inclination of the veining (V), as schematically shown in FIG. 6*a*.

Figure 6B:
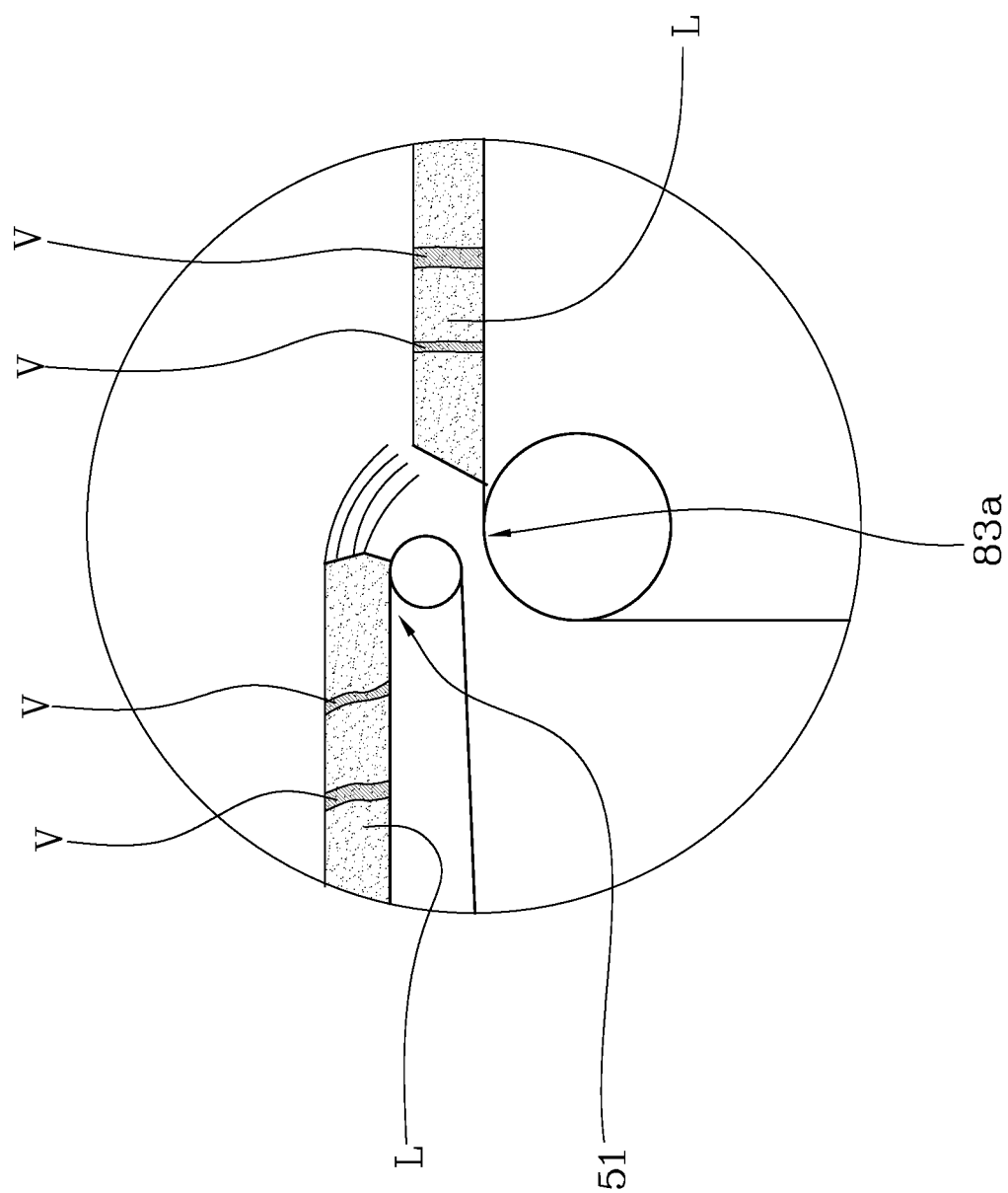
FIG. 6b shows an enlarged view of zone V of FIG. 4.

The transfer of the layer (L) from the deposit plane (50) to the movable plane (83) of the press (80) instead occurs in the same advancement direction. The relative movement that is produced in the fall or passage of the material from the deposit plane (50) to the movable plane (83) is thus directed in the opposite direction with respect to that which is produced in the passage from the cavities (11) to the deposit plane (50). This then allows inclining the veinings (V) in the opposite direction, as schematically shown in FIG. 6*b*, so as to bring the veinings (V) to a substantially vertical inclination, or regardless to a desired inclination.

Furthermore, by adjusting the relative speed between the deposit plane (50) and the movable plane (83) it is possible to vary the thickness of the layer (L) on the movable plane (83).

The invention claimed is:

1. A dispensing device for a granular material, comprising a dispensing channel (20) provided with an inlet opening (21) and an outlet opening (22), wherein:
    the dispensing channel (20) comprises an inlet portion (21*a*) having a solid surface, an intermediate portion (23) having a solid surface, and an outlet portion (22*a*) having a solid surface,
    the inlet portion (21*a*) is configured to connect the inlet opening (21) and the intermediate portion (23) and is provided with a first longitudinal axis (X);
    the intermediate portion (23) is configured to connect the inlet portion (21*a*) and the outlet portion (22*a*) and is provided with a second longitudinal axis (Y),
    the outlet portion (22*a*) is configured to connect the intermediate portion (23) and the outlet opening (22) and is provided with a third longitudinal axis,
    the first longitudinal axis extends in the same direction as the third longitudinal axis (X) and in a direction different from the second longitudinal axis (Y);
    the intermediate portion (23) has a length (L) and a height (H), measured on a vertical plane containing the second longitudinal axis (Y), wherein the height (H) is measured perpendicular to the length (L);
    the intermediate portion (23) is configured to enable the deposit and accumulation of a predetermined quantity of granular material coming from the inlet opening (21);
    the intermediate portion comprises a motor that can be activated on command to cause the granular material to flow in advancement from the intermediate portion (23) towards the outlet opening (22),
    wherein the motor comprises pneumatic means (24, 25, 26), provided with a blow opening (24) located along the intermediate portion (23),
    wherein the blow opening (24) is located on a bottom wall (23*a*) of the intermediate portion, and
    a filter (25) extending entirely across the blow opening (24) is contiguous with the solid surface of the intermediate portion (23) and is parallel to the second longitudinal axis (Y).

2. The dispensing device according to claim 1, wherein the intermediate portion (23) has an inclination with respect to a horizontal plane, a height (H) and a length (L) that are such as to halt by force of gravity the flow of the granular material from the inlet opening (21) towards the outlet opening (22).

3. The dispensing device according to claim 2, wherein, with the internal angle of repose (a) of the granular material known, the height (H) multiplied by the cotangent of the internal angle of repose (a) is smaller than the length (L) of the intermediate portion (23); the internal angle of repose (a) being measured with respect to a bottom wall (23a) of the intermediate portion (23).

4. The dispensing device according to claim 3, wherein the bottom wall (23a) of the intermediate portion (23) has substantially horizontal inclination.

5. The dispensing device according to claim 1, wherein the pneumatic means (24, 25, 26) comprise an air supply source (26), connected to the blow opening (24), which is provided with control means that can be activated on command to send an air flow to the blow opening (24).

6. The dispensing device according to claim 1, wherein the motor comprises a vibrating unit (60), associated with the intermediate portion (23) and provided to transmit a controlled vibration to the intermediate portion (23).

7. The dispensing device according to claim 6, wherein the vibrating unit (60) comprises a mass (61) movable inside a container (62).

8. The dispensing device according to claim 7, wherein the container (62) is provided with at least one supply opening (63) connectable to an air supply source (26), and at least one outlet opening (64).

9. The dispensing device according to claim 1, wherein the motor comprises a vibrating unit (60), associated with the intermediate portion (23) and provided to transmit a controlled vibration to the intermediate portion (23); and wherein the vibrating unit (60) comprises a mass (61) movable inside a container (62); and wherein the container (62) is provided with at least one supply opening (63) connectable to an air supply source (26), and at least one outlet opening (64); and wherein the outlet opening (64) is placed in communication with the blow opening (24).

10. The dispensing device according to claim 9, wherein the outlet opening (64) and the blow opening (24) are connected to one another through a volume (29).

11. The device according to claim 1, wherein the motor comprises a vibrating unit (60), associated with the intermediate portion (23) and provided to transmit a controlled vibration to the intermediate portion (23); and wherein the vibrating unit (60) comprises a mass (61) movable inside a container (62); and wherein the container (62) is provided with at least one supply opening (63) connectable to an air supply source (26), and at least one outlet opening (64); and comprising a second supply opening (28), connected to the blow opening (24).

12. The dispensing device according to claim 9, wherein the air supply source (26) is connected to the blow opening (24) and/or to the supply opening (63).

13. A machine for the dry decoration of ceramic slabs or tiles, comprising:
a support element (10), provided with a plurality of cavities (11) of predetermined shape; at least one dispensing device (2) according to claim 1, arranged to deposit a predetermined quantity of powdered material inside one or more predetermined cavities (11);
an unloading device (30), arranged to move the cavities (11) from a loading position, wherein they can receive the powdered material from the dispensing device (2), to an unloading position, wherein they can unload the powdered material.

14. The machine according to claim 13, wherein the dispensing device (20) comprises one or more dispensers, each of which is arranged to dispense the powdered material in one or more predetermined cavities (11).

15. The machine according to claim 13, comprising a deposit plane (50), placed below the unloading position of the cavities (11) so as to receive the powdered material unloaded by the cavities (11).

16. A method for dispensing a granular material for use with the dispensing device of claim 1, the method comprising the following steps:
supplying the granular material to the inlet opening (21), so that the granular material is deposited at least in part on the intermediate portion (23), stopping there; and
activating the motor means to cause the granular material to flow in advancement from the intermediate portion (23) towards the outlet opening (22).

17. The method according to claim 16, wherein the step of activating the motor means comprises a step of supplying an air flow to the blow opening (24).

18. The method according to claim 17, wherein the step of supplying an air flow to the blow opening (24) provides for a control of the air flow in on/off mode, with the possible control of the activation/deactivation frequency of the air flow, and/or a proportional control of the air flow, as a function of at least one significant parameter of the dispensing of granular material.

19. The method according to claim 16, wherein the motor means comprise a vibrating unit (60), associated with the intermediate portion (23), wherein the activation step of the motor means comprises an activation step of the vibrating unit (60).

20. The method according to claim 19, wherein the vibrating unit (60) can be activated by means of supplying an air flow, and wherein the step of activating the vibrating unit (60) comprises supplying an air flow to the vibrating unit (60).

* * * * *